March 24, 1953          L. R. RISSLER          2,632,199
DOOR HANGER WHEEL
Filed June 30, 1947
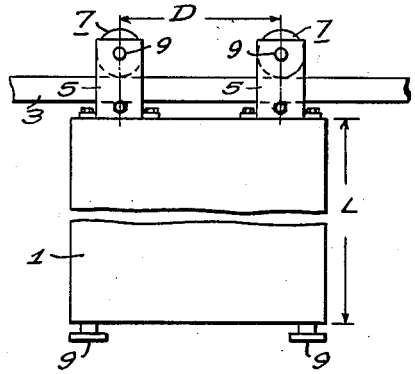
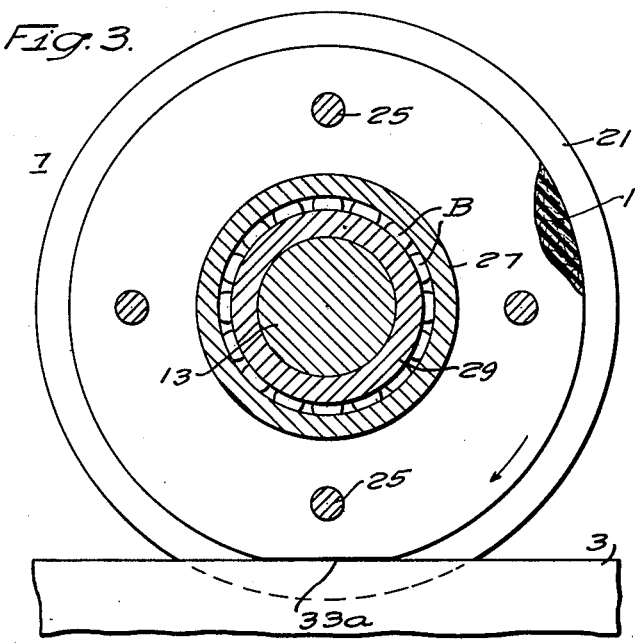
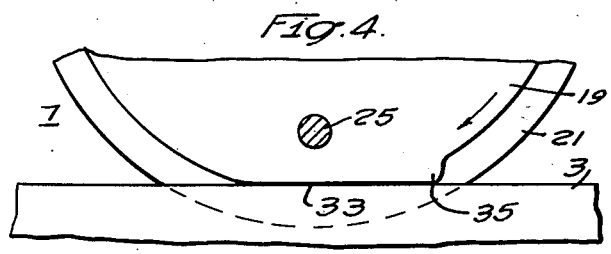
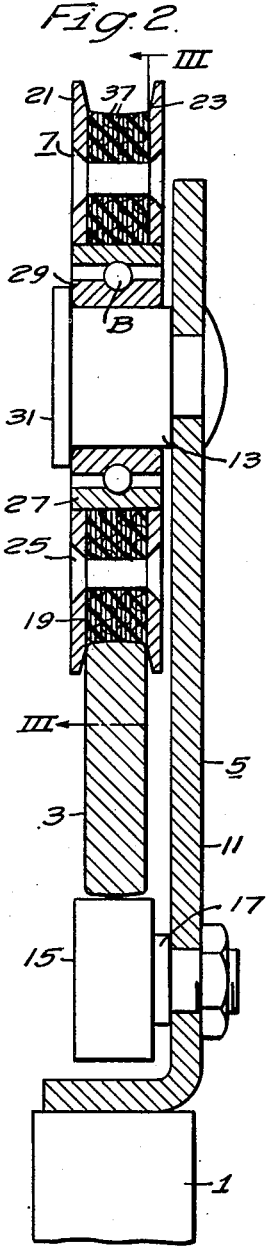
WITNESSES:
INVENTOR
Lennius R. Rissler.
BY
ATTORNEY Patented Mar. 24, 1953

2,632,199

UNITED STATES PATENT OFFICE 2,632,199

DOOR HANGER WHEEL

Lennius R. Rissler, Hohokus, N. J., assignor to Westinghouse Electric Corporation, East Pittsburgh, Pa., a corporation of Pennsylvania Application June 30, 1947, Serial No. 758,087

16 Claims. (Cl. 16—107)

This invention relates to guide assemblies employing wheels and it has particular relation to wheels for guiding loads along a predetermined track.

Although wheels have been employed for the purpose of guiding various types of loads over tracks, the invention will be described with particular reference to door hangers.

The operation of doors along tracks presents a number of problems. This is particularly true for power-operated doors which operate with high rates of acceleration and deceleration. Such doors generally carry wheels which operate over fixed tracks or rails. Because of repeated travel over the same path, any tendency of the wheels to wear the tracks irregularly is highly objectionable. If the wheels are too soft or resilient, oscillatory or weaving motions of the doors are produced with resultant noise and wear. Preferably, excessive lubrication should be avoided for the reason that lubricant would tend to accumulate debris with the resultant formation of an irregular track surface, and for the further reason that lubrication of tracks involves a substantial maintenance cost. In addition, the wheels should operate with low friction and require little power.

The prior art has long recognized the desirability of silently operating doors. For example, the Lane Patent 422,305, which issued in 1890, endeavors to provide a wheel with a noiseless tread for a door hanger. Numerous inventors since Lane have endeavored to produce satisfactory wheels employing materials such as phenolic resins and rubber, but all prior art wheels have failed to give complete satisfaction.

In accordance with the invention, a wheel is provided having a resilient tread which is sufficiently soft to deform and distribute the weight of its associated load (which may be an elevator door) over an adequate area of a track. However, the softness is restricted to a value which does not form a bead on the wheel adjacent its point of contact with the associated track. Furthermore, the softness is insufficient to result in oscillation of the load carried by the wheel during operation of the wheel over its track.

The invention contemplates the provision of a wheel having a flexible cellular matrix or filler which is substantially coextensive with the wheel. The matrix has associated therewith an elastomer binder. The matrix and the binder are proportioned to provide the desired performance. In a preferred embodiment of the invention, the wheel comprises a disc constructed of laminated fabric. Preferably a closely-woven, lubricant-absorbing fabric such as canvas is employed. Although an elastomer in the form of natural rubber may be employed, preferably a synthetic elastomer which is more resistant to oils is employed as a binder.

The laminated disc conveniently may be secured between two rigid discs which restrain axial spreading of the laminated disc and which prevents axial displacement of the wheel relative to the associated track.

It is, therefore, an object of the invention to provide an improved guide assembly employing a wheel associated with a track.

It is an additional object of the invention to provide a resilient wheel having sufficient softness to distribute load applied thereto over a substantial area of an associated track.

It is another object of the invention to provide a wheel comprised of a disc formed of a cellular flexible material and an elastomer binder.

It is also an object of the invention to provide a wheel wherein the disc mentioned in the preceding paragraph is secured between two rigid discs.

It is still a further object of the invention to provide a wheel comprising a laminated canvas disc and an elastomer binder.

It is also an object of the invention to provide a wheel as defined in the preceding objects associated with a track.

It is another object of the invention to provide a wheel comprising a disc formed of a lubricant-absorptive cellular matrix and an elastomer binder.

Other objects of the invention will be available from the following description taken in conjunction with the accompanying drawing, in which:

Figure 1 is a view in side elevation with parts broken away of a door mounted for reciprocation along a track;

Fig. 2 is a view in section of a door hanger suitable for the door of Fig. 1;

Fig. 3 is a view taken along the line III—III of Fig. 2; and

Fig. 4 is a view similar to the view of Fig. 3 with parts broken away showing the result of utilization of different materials.

Referring to the drawing, Fig. 1 shows a door 1 which is mounted for reciprocation along a horizontal rail or track 3. Two spaced hangers 5 are secured to the upper edge of the door 1 for the purpose of guiding the door on the track 3. Each of the hangers includes a wheel 7 for engaging the associated track. In addition, the door at its lower edge may have rollers or pins 9 for guiding the lower edge of the door in a manner well understood in the art along a lower track (not shown).

The door 1 has a length dimension L which is large compared to the distance D between the wheels 7. For this reason, forces which are applied to the door for the purpose of reciprocating the door along its track 3 have a tendency to produce rotation of the door about the point of contact of one of the wheels 7 with the associated track 3. If the wheels 7 are constructed of resilient material which is too soft, the tendency of the door to rotate may produce excessive oscillation with resultant noise and wear. This is particularly true for doors operating with the high rates of acceleration and deceleration encountered in power-operated doors.

One of the hangers 5 is shown in detail in Fig. 2. The hanger includes bracket 11 which is secured to the upper edge of the door 1. This bracket has riveted thereto a post 13 for receiving the wheel 7. In addition, a small upthrust roller 15 may be rotatably mounted on a shaft 17 secured to the bracket 11. The roller 15 prevents excessive movement of the door in an upward direction.

The wheel 7 includes a resilient disc 19 having a substantially cylindrical outer exposed surface which engages the upper edge of the rail or track 3. The load represented by the door 1 is transmitted to the track 3 by means of this disc 19. The disc 19 is secured between two rigid discs 21 and 23 which conveniently may be constructed of steel. It will be noted that the discs 21 and 23 have diameters which are larger than the diameter of the resilient disc 19. Consequently, the discs 21 and 23 overhang the track 3 to prevent substantial axial movement of the wheel 7 relative to the track 3. The discs may be secured to each other in any suitable manner as by rivets 25.

The wheel 7 is mounted for rotation on the post 13 in any suitable manner. In the specific embodiment illustrated, the outer race 27 of a ball-bearing B extends through the wheel 7 and is secured thereto in any desired manner as by a press fit. The inner race 29 of the ball-bearing is secured to the post 13 in any suitable manner as by a press fit. If desired, a head 31 may be provided on the post 13 to maintain the inner race 29 in operative position.

Particular consideration should be given to the construction of the resilient disc 19. If this disc is too hard, substantially a line contact is obtained between the disc and the associated track 3. Such contact has a tendency to corrugate the track 3. Furthermore, a hard disc tends to produce excessive noise, particularly when associated with doors which move at high rates of speed.

On the other hand, if the material of the disc 19 is too soft, a condition is obtained such as that represented in Fig. 4. If the disc 19 of Fig. 4 is rotated in the direction of the arrow about its axis, the surface of the disc 19 has a substantial flattened area 33 in engagement with the track 3 and in addition, has a bead 35 formed adjacent the point of contact of the track 3. The continually changing stresses in the bead 35 produce excessive heating and deterioration of the disc. As a result of disintegration, particles of a disc tend to form pellets on the track 3 and corrugation of the track 3 takes place. Such operation was particularly noticeable in prior-art rubber wheels.

Fig. 3 discloses the desired engagement between the disc 19 and track 3. It will be noted that the disc 19 has a substantial flattened area 33a engaging the track 3. This area is sufficient to distribute the load on the wheel over a substantial part of the track 3. However, the disc 19 of Fig. 3 does not deform to an extent such that a bead similar to the bead 35 of Fig. 4 is formed. Consequently, the disc operates with little friction or heating and does not deteriorate appreciably.

To obtain the desired performance of the wheel 7, the disc 19 may be constructed of a flexible cellular matrix or filler which is substantially coextensive with the disc itself. Various strong textile materials such as nylon, silk, or rayon may be employed as fillers or a wire cloth such as brass cloth could be employed. In a preferred embodiment of the invention, the matrix is formed by a plurality of laminations 37 of woven fabric such as cotton sheeting or canvas. The layers of cotton sheeting or canvas are disposed in side-by-side relation in alignment and transverse to the axis of the wheel 7.

The matrix represented by the layers of the cotton sheeting or canvas are bound together by an elastomer. Although the elastomer may be natural rubber, preferably an elastomer is employed which is resistant to lubricants, such as petroleum oils. Elastomers such as synthetic rubbers are suitable for binders and a number of such rubbers will be found listed on page 695 of the Handbook of Chemistry, by M. A. Lange, 1944, published by Handbook Publishers of Sandusky, Ohio. A chloroprene polymer which is available on the market under the trade name "neoprene" is an example of a suitable synthetic rubber which is resistant to petroleum oils. The elastomer known as "Buna S" is a further example of material which may be employed. This elastomer is listed in the aforesaid handbook.

The operation of the wheel 7 is determined to a substantial extent by the proportions of the filler and of the elastomer employed for the disc 19. If the ratio of elastomer to filler is too large, or if no filler is employed, the wheel may operate in the manner discussed with reference to Fig. 4. A disc 19 wherein the filler represents 50% to 90% of the total weight of the disc has been found satisfactory. Particularly good results are obtained for a disc having a weight of cotton canvas or sheeting approximately 70% of the total weight of the disc 19. The elastomer flows through the fabric layers to bond the threads to each other throughout the disc. If the elastomer is of the vulcanizing type, the elastomer may be vulcanized with the woven fabric under pressure. The elastomer may be vulcanized and cured to a hardness preferably of about 85 durometer or greater. The procedure may be similar to that employed for manufacturing rubber-fabric belting. After vulcanization, the disc 19 may be assembled between the discs 21 and 23 and secured thereto by means of the rivets 25.

The fabric fibers prevent excessive spreading of the disc 19, particularly in the direction of travel. The discs 21 and 23 not only serve to guide the wheels along the track 3 but they prevent spreading of the disc 19 under load in a direction parallel to the axis of the wheel.

Preferably, the filler is absorptive with respect to lubricants such as petroleum oil. A cotton fabric such as canvas or sheeting has suitable absorptive properties. It has been found that if the disc 19 is impregnated with a lubricant such as a petroleum oil, a substantial amount of lubricant is absorbed by the cotton fabric and the lubricant is applied slowly to the associated track. The lubricant provides an extremely thin film on the track 3 and prevents excessive friction between the track and the discs 21 and 23. Consequently, the wheel may be operated for long periods without further lubrication.

The fabric employed has an extremely low hysteresis or energy loss. For this reason and for the further reason that a bead similar to the bead 35 is not obtained in operation, the wheel 7 does not heat excessively and does not deteriorate noticeably. Furthermore, the material has a scrubbing action which tends to remove pellets or debris which may be disposed for any reason on the surface of the track 3. Low hysteresis loss implies low rolling friction with the accompanied ease of operations.

A wheel constructed in accordance with the invention spreads sufficiently as shown in Fig. 3 to distribute the load over a substantial area of the track 3. It is not so soft that oscillations or vibrations are set up during the opening and closing of the associated door. For these reasons, the wheel may operate for an exceptionally large number of operations over the associated track without corrugating or unduly wearing the track and rolls on the track with very little noise.

Although the invention has been described with reference to certain specific embodiments thereof, numerous modifications are possible thereafter. The appended claims are to be construed to cover not only the specific embodiments herein illustrated but also all other embodiments which fall within the spirit and scope of the invention.

I claim as my invention:

1. In an edge-loaded door-hanger wheel, a wheel disc comprising a flexible filler and an elastomer binder intimately bonding the flexible filler, the ratio of the binder to the filler being selected from a range of $\frac{1}{9}$ to 1 by weight to provide a flattening of the disc under a radially-applied load to prevent undue local loading of a surface over which the wheel disc runs, said ratio being below the value at which rotation of the wheel disc under a radially-applied load on a surface forms a bead on the disc adjacent the surface.

2. In a radially-loaded door-hanger wheel, a disc comprising a plurality of plane layers of fabric in superimposed relationship transverse to the axis of the disc, and synthetic rubber binding the layers of fabric, said synthetic rubber having a weight in the range of 10% to 50% of the weight of the disc.

3. In a radially-loaded door-hanger wheel, a disc comprising a plurality of cotton fabric discs in superimposed relationship, and oil-resistant synthetic rubber binding the layers of fabric, said rubber having a weight in the range of 10% to 50% of the weight of the disc, and said rubber having a durometer hardness in excess of 80.

4. In a door-hanger wheel having a pair of aligned, axially-spaced rigid discs, the combination with said discs of a central disc secured between the rigid discs and aligned therewith, said rigid discs covering the faces of the central disc and preventing axial spreading of the central disc, said central disc comprising a plurality of layers of fabric transverse to the axis of the wheel, and an elastomer uniting said layers of fabric.

5. A door-hanger wheel comprising a pair of aligned, axially-spaced rigid discs, and a central disc secured between the rigid discs and aligned therewith, said central disc having a diameter smaller than the diameters of the rigid discs, said central disc comprising a plurality of layers of fabric transverse to the axis of the wheel, and an elastomer binding the layers of fabric.

6. In a door guide assembly having a guide track and having a wheel comprising a pair of spaced rigid discs, the combination with the track and wheel of a central disc secured between the rigid discs and aligned therewith, said central disc having a diameter smaller than the diameters of the rigid discs and having a thickness greater than the guide track, whereby the guide track may extend between the edges of the rigid discs in engagement with the exposed cylindrical surface of the central disc, said central disc comprising a plurality of layers of fabric transverse to the axis of the wheel and an elastomer uniting the layers of fabric.

7. In a roller for a track bearing means including a pair of relatively rotatable nested, first and second bearing members for said roller, an annular, resilient core element surrounding the bearing members, said core element and the bearing members having a common axis, said core element comprising flat, annular superimposed layers of fabric and an elastomer bonding the layers of fabric to each other, the elastomer being less than 50% by weight of the core element, and two flat, circular, rigid discs respectively disposed in engagement with opposite sides of the resilient core, said rigid discs being secured to the first bearing member for rotation as a unit therewith about the second bearing member.

8. In an edge-loaded door-hanger wheel, a wheel disc comprising a flexible filler and an elastomer binder intimately bonding the flexible filler, the ratio of the binder to the filler being selected from a range of $\frac{1}{9}$ to 1 by weight to provide a flattening of the disc under a radially-applied load to prevent undue local loading of a surface over which the wheel disc runs, said ratio being below the value at which rotation of the wheel disc under a radially-applied load on a surface forms a bead on the disc adjacent the surface, the elastomer binder being lubricant-resistive and the filler being an absorbent for lubricant, said filler being impregnated with a lubricant.

9. In an edge-loaded door-hanger wheel, a wheel disc comprising a flexible filler and an elastomer binder intimately bonding the flexible filler, the ratio of the binder to the filler being selected from a range of $\frac{1}{9}$ to 1 by weight to provide a flattening of the disc under a radially-applied load to prevent undue local loading of a surface over which the wheel disc runs, said ratio being below the value at which rotation of the wheel disc under a radially-applied load on a surface forms a bead on the disc adjacent the surface, the binder being an oil-resistant synthetic rubber and said filler being woven cotton fabric.

10. A door-hanger wheel comprising a pair of aligned, axially-spaced rigid discs, and a central disc secured between the rigid discs and aligned therewith, said central disc having a diameter smaller than the diameters of the rigid discs, said central disc comprising a plurality of layers of fabric transverse to the axis of the wheel, and an elastomer binding the layers of fabric, the weight of the elastomer being 10% to 50% of the weight of the central disc.

11. A door-hanger wheel comprising a pair of aligned, axially-spaced rigid discs, and a central disc secured between the rigid discs and aligned therewith, said central disc having a diameter smaller than the diameters of the rigid discs, said central disc comprising a plurality of layers of fabric transverse to the axis of the wheel, and an elastomer binding the layers of fabric, the weight of the elastomer being 10% to 50% of the weight of the central disc, the elastomer being an oil-resistant synthetic rubber, and said rubber having a durometer hardness in excess of 80.

12. In a door guide assembly having a guide track and having a wheel comprising a pair of spaced rigid discs, the combination with the track and wheel of a central disc secured between the rigid discs and aligned therewith, said central disc having a diameter smaller than the diameters of the rigid discs and having a thickness greater than that of the guide track, whereby the guide track may extend between the edges of the rigid discs in engagement with the exposed cylindrical surface of the central disc, said central disc comprising a plurality of layers of fabric transverse to the axis of the wheel and an elastomer uniting the layers of fabric, the elastomer comprising 10% to 50% of the weight of the central disc.

13. In a door guide assembly having a guide track and having a wheel comprising a pair of spaced rigid discs, the combination with the track and wheel of a central disc secured between the rigid discs and aligned therewith, said central disc having a diameter smaller than the diameters of the rigid discs and having a thickness greater than that of the guide track, whereby the guide track may extend between the edges of the rigid discs in engagement with the exposed cylindrical surface of the central disc, said central disc comprising a plurality of layers of fabric transverse to the axis of the wheel and an elastomer uniting the layers of fabric, the elastomer comprising synthetic rubber having a weight equal substantially to 10% to 50% of the weight of the central disc, and having a durometer hardness in excess of 80.

14. In a door guide assembly having a guide track and having a wheel comprising a pair of spaced rigid discs, the combination with the track and wheel of a central disc secured between the rigid discs and aligned therewith, said central disc having a diameter smaller than the diameters of the rigid discs and having a thickness greater than that of the guide track, whereby the guide track may extend between the edges of the rigid discs in engagement with the exposed cylindrical surface of the central disc, said central disc comprising a plurality of layers of fabric transverse to the axis of the wheel and an elastomer uniting the layers of fabric, the fabric being lubricant-absorbent fabric impregnated with lubricant.

15. In a door guide assembly having a guide track and having a wheel comprising a pair of spaced rigid discs, the combination with the track and wheel of a central disc secured between the rigid discs and aligned therewith, said central disc having a diameter smaller than the diameters of the rigid discs and having a thickness greater than that of the guide track, whereby the guide track may extend between the edges of the rigid discs in engagement with the exposed cylindrical surface of the central disc, said central disc comprising a plurality of layers of fabric transverse to the axis of the wheel and an elastomer uniting the layers of fabric, the fabric being woven cotton comprising substantially 70% of the weight of the central disc, and the elastomer being oil-resistant.

16. In a roller for a track, bearing means including a pair of relatively rotatable nested, first and second bearing members for said roller, an annular, resilient core element surrounding the bearing members, said core element and the bearing members having a common axis, said core element comprising flat, annular superimposed layers of fabric and an elastomer bonding the layers of fabric to each other, the elastomer being less than 50% by weight of the core element, two flat, circular, rigid discs respectively disposed in engagement with opposite sides of the resilient core, said rigid discs being secured to the first bearing member for rotation as a unit therewith about the second bearing member, and tie members extending parallel to said axis through the core element for securing the rigid discs to each other and to the core element, said tie members being spaced radially of said axis from said bearing members.

LENNIUS R. RISSLER.

REFERENCES CITED

The following references are of record in the file of this patent:

UNITED STATES PATENTS

| Number | Name | Date |
|---|---|---|
| 422,305 | Lane | Feb. 25, 1890 |
| 905,756 | Skinner | Dec. 1, 1908 |
| 1,118,227 | Pepple | Nov. 24, 1914 |
| 1,304,165 | Dobbins | May 20, 1919 |
| 1,631,928 | Doty | June 7, 1927 |
| 1,734,326 | Chesnutt | Nov. 5, 1929 |
| 1,922,556 | Millet | Aug. 15, 1933 |
| 1,936,863 | Skillman | Nov. 28, 1933 |
| 1,967,863 | Collins et al. | July 24, 1934 |
| 2,052,603 | Christenson | Sept. 1, 1936 |
| 2,096,692 | Cilley | Oct. 19, 1937 |
| 2,145,343 | Dempsey | Jan. 31, 1939 |
| 2,196,569 | Stroehla et al. | Apr. 9, 1940 |
| 2,436,222 | Neal et al. | Feb. 17, 1948 |
| 2,448,455 | Murray | Aug. 31, 1948 |

FOREIGN PATENTS

| Number | Country | Date |
|---|---|---|
| 567,048 | Germany | Dec. 27, 1932 |